United States Patent [19]

Skostins

[11] 4,434,195
[45] Feb. 28, 1984

[54] BONDING SILICONE RUBBER

[75] Inventor: Olgerts Skostins, Midland, Mich.

[73] Assignee: Dow Corning Corporation, Midland, Mich.

[21] Appl. No.: 347,207

[22] Filed: Feb. 9, 1982

Related U.S. Application Data

[63] Continuation-in-part of Ser. No. 172,874, Jul. 28, 1980, abandoned.

[30] Foreign Application Priority Data

Jun. 26, 1981 [CA] Canada .................................. 380714

[51] Int. Cl.³ .............................................. B05D 3/02
[52] U.S. Cl. .................................... 427/387; 156/228; 156/329; 427/388.2; 427/389.8; 525/477; 525/478; 525/479; 528/24; 528/32
[58] Field of Search ..................... 427/387, 388–388.2, 427/389.8, 393.5; 156/329, 228; 264/241, 347, 510, 244.11, 228, 244.27; 525/477, 478, 479; 528/24, 32

[56] References Cited

U.S. PATENT DOCUMENTS

| | | | |
|---|---|---|---|
| 2,751,314 | 6/1956 | Keil | 427/387 X |
| 3,261,739 | 7/1966 | Porter | 428/428 |
| 3,325,440 | 6/1967 | Smith-Johannsen | 156/329 X |
| 3,379,607 | 4/1968 | Foster | 156/329 X |
| 3,730,932 | 5/1973 | DeZuba et al. | 156/329 X |
| 3,794,612 | 2/1974 | Plueddeman | 524/296 |
| 3,813,364 | 5/1974 | DeZuba et al. | 524/588 |
| 4,033,924 | 7/1977 | Mine et al. | 523/216 |
| 4,177,301 | 12/1979 | Smith, Jr. | 427/401 |
| 4,202,812 | 5/1980 | Murray | 524/48 |

Primary Examiner—Thurman K. Page
Attorney, Agent, or Firm—Roger H. Borrousch

[57] ABSTRACT

A heat vulcanizable silicone rubber composition has been developed which bonds cohesively to many substrates with either vinyl specific or non-vinyl specific organic peroxide vulcanizing agents when vulcanized in contact with the clean substrate. A method has been developed which uses an adhesion additive composition consisting essentially of polydiorganosiloxane gum, filler, ethylpolysilicate, and a specific acryloxyalkylsilane. The method combines the adhesion additive with silicone rubber stock and organic peroxide vulcanizing agent to yield the heat vulcanizable silicone rubber composition which bonds to substrates.

9 Claims, No Drawings

BONDING SILICONE RUBBER

This is a continuation-in-part of application Ser. No. 172,874, filed July 28, 1980 now abandoned.

BACKGROUND OF THE INVENTION

1. Field of the Invention

This invention relates to a heat vulcanizable silicone rubber composition which strongly adheres to a wide variety of substrates. This invention also covers a composition useful as an additive for heat activated organic peroxide vulcanizable rubber to provide the bonding characteristic to the rubber; and the silicone rubber compositions containing the additive and methods of using.

2. Description of the Prior Art

Silicone rubber has become one of the useful specialty elastomers available to industry. In many applications it is desirable to bond silicone rubber to various substrates. Silicone rubber does not normally adhere to solid surfaces as strongly as desired. Over the years, various methods have been devised to improve the bonding of silicone rubber to different types of substrates. These methods include the use of a primer on the surface of the substrate, as well as additives to the unvulcanized silicone rubber.

In U.S. Pat. No. 2,744,878, issued May 8, 1956, Smith-Johannsen discloses elastic organopolysiloxanes of improved heat resistance and adhesion containing an organic silicate and calcium carbonate. His composition comprises an organopolysiloxane, calcium carbonate filler, peroxide curing agent, and liquid partial hydrolysis product of monomeric organosilicates. The organosilicate is said to improve the adhesion to surfaces. He teaches his composition must be used and cured within 12 hours after mixing, unless the filler and organosilicate are heated together before the addition of the other ingredients.

In U.S Pat. No. 2,751,314, issued June 19, 1956, to Keil, it was noted that methods of bonding some few silicone rubbers to some few solid materials was known, but no single means for bonding many combinations was known.

Keil teaches a method of adhering silicone rubber to the surface of a solid comprising first depositing a titanium compound coating on the surface, then depositing on the titanium coating a coating consisting essentially of a mixture of partially hydrolyzed alkylpolysilicate and toluene soluble organopolysiloxanes. If desired, additional layers of silicone rubber can be deposited. The method is stated to provide adhesion to many types of surfaces. In his Example 4, he showed that a room temperature vulcanizing rubber prepared from dimethylsiloxane polymer, diatomaceous earth, ethylpolysilicate, and lead octoate did not adhere to an aluminum panel without his primer system. In Example 5, he states that equivalent results are obtained on steel, cadmium steel, nickel, tin, copper, porcelain, resin laminates and glass cloth.

In U.S. Pat. No. 3,261,739, issued July 19, 1966, Porter teaches a laminated glass windshield containing as an interlayer, a layer of transparent organosilicon elastomer. In the preferred embodiment, the interlayer comprises an organopolysiloxane gum, filler, ethylpolysilicate and dicumyl peroxide catalyst. The cured elastomer was said to have excellent adhesion to glass, electrically conducting films deposited on glass and polyvinylbutyral, but there is no indication of the actual bond strength obtained.

Smith-Johannsen in U.S. Pat. No. 3,325,440, issued June 13, 1967, teaches the addition of unhydrolyzed organosilicates to curable organopolysiloxanes to improve the reversion resistant at high temperatures. Ethylorthosilicate is shown to be useful in his system. When his procedure is followed, the composition is stated to adhere to a variety of substrates, but no indication is given as to the degree or type of adhesion achieved.

Foster in U.S. Pat. No. 3,379,607, issued Apr. 23, 1968, teaches that bonding of cured diorganosiloxanes to solid substrates is best accomplished through the use of a primer system. Foster teaches that adding a compound, such as methacryloxypropyltrimethoxysilane, to the uncured elastomer as a rule possesses the disadvantage of inducing physical property changes in the polysiloxane which are undesirable. Foster shows a primer obtained by contacting a phosphorus containing compound with a silane containing at least one $CH_2=CH$ group. Foster obtained cohesive failure, at least in some cases, when using his primer system.

DeZuba et al. in U.S. Pat. No. 3,730,932, issued May 1, 1973, teach a self-bonding, heat-curable composition that includes a maleate or silylmaleate as an additive to promote bonding to a substrate. In U.S. Pat. No. 3,813,364, issued May 28, 1974, they show that cyanurates, isocyanurates, silyl-cyanurates, and silylisocyanurates are also useful.

In U.S. Pat. No. 3,794,612, issued Feb. 26, 1974, Plueddemann teaches a silicone rubber composition having improved adhesion to unprimed substrates. His composition comprises a silicone rubber stock and 2 to 10 parts of diallylphthalate. Pleuddemann theorized that the diallylphthalate functions because it is relatively compatible with the unvulcanized silicone rubber, but separates because it is only partially compatible during vulcanization and thus provides a surface layer having adhesive properties. The mixture is further enhanced by the addition of an alkoxy silane having a vinyl or allyl radical. A mixture containing diallyl o-phthalate and vinyltrimethoxysilane adhered to glass and aluminum, giving cohesive failure of the rubber when tested after 4 hours in boiling water.

Mine et al. in U.S. Pat. No. 4,033,924, issued July 5, 1977, point out in their discussion of the prior art that curable silicone rubbers and resins which cure through the application of heat and peroxide catalyst do not possess completely satisfactory adhesion to other materials. They also point out the disadvantages of using primer systems. They then teach a composition which consists of an organopolysiloxane, filler, organic peroxide catalyst, and an organosilicon compound containing at least one epoxy group, at least one alkyl group, and at least one low molecular weight alkenyl group or hydrogen atom bound to silicon. The composition, when cured in contact with a surface, adheres to metals, plastics, ceramics, fibers, wood, paper and others. Their examples show cohesive failure on bonding to ceramic surfaces and plastic surfaces, while improved peel adhesion was shown for various metal surfaces. Without the epoxy containing additive, the compositions did not bond sufficiently to give cohesive failure; the adhesive failure was at much lower values.

Smith in U.S. Pat. No, 4,177,301, issued Dec. 12, 1979, then shows a primer system suitable for bonding both room temperature vulcanizing silicone rubber and heat vulcanizable silicone rubber. Smith teaches that self-bonding, heat vulcanizable silicone rubber compositions, which he has previously mentioned as incorporating a silyl isocyanurate or silylmaleate as a self-bonding additive, have difficulties. He points out that they are usually a very complex type of system and they require the addition or presence in the composition of very complex chemical self-bonding additives, which unduly increase the cost of the composition. He further states that without the use of a primer such compositions do not have as high an adherence to the substrate as would be desired in some cases, as when the cured silicone elastomer is under water immersion for a substantial period of time. Smith teaches the use of a primer produced by reacting an alkylacrylate or alkylmethacrylate with an acrylate silane then adding additional acrylate silane.

Belgian Pat. No. 878,521, issued Feb. 29, 1980 to Murray, teaches a method for improving bonding of a silicone rubber to a substrate surface. The method mixes silicone rubber base, optional extending filler, organic peroxide vulcanizing agent, and from 0.1 to 1.5 parts by weight of an acryloxyalkylsilane. The mixture is formed against a surface and heated to vulcanize, yielding a vulcanized silicone rubber bonded to the substrate surface. The composition is shown to bond to aluminum, cold-rolled steel, stainless steel, and glass fiber fabric.

U.S. Pat. No. 4,202,812, issued May 13, 1980 to Murray, teaches silicone rubber compositions containing extending fillers and acryloxyalkylsilanes. He states that at 0.5 part of acryloxyalkylsilane per 100 parts of silicone rubber base, the cured composition can adhere to the aluminum plates used in the molding process.

In spite of the vast teaching of the art, much of it conflicting, there is still need to improve the bonding capabilities of heat vulcanizable silicone rubber compositions to substrates. Many of the systems taught provide only adhesive type bonding. Such a type of bonding is not satisfactory in most cases. The systems using a primer require a separate step in the bonding process which increases costs. In many cases the primers must be carefully applied and cured in order to function properly. The primed surface must be adhered to within a short period of time in order to obtain the best results. Many of the systems using additives have disadvantages such as failure to form bonds with a wide variety of substrates, failure to maintain satisfactory bond during use conditions such as exposure to elevated temperature or water immersion, and failure to form satisfactory bonds when used in conjunction with many kinds of heat vulcanized silicone rubber and vinyl specific or non-vinyl specific organic peroxide vulcanizing agents.

Satisfactory bonding between heat vulcanizable silicone rubber and a variety of substrates is very complex, particularly when an additive approach is used. The additive must provide all the advantages of improved bonding without adversely reacting with the silicone rubber to degrade the rubber properties.

In order for a bonding system to be completely satisfactory, the bond between the rubber and the substrate should be at least as strong as the rubber itself. When the rubber is forced away from the substrate, the failure should be by cohesive failure of the rubber. Such cohesive failure should occur with the widest possible variety of substrates, many kinds of silicone rubber, and many organic peroxide catalysts.

SUMMARY OF THE INVENTION

A heat vulcanizable silicone rubber composition comprising silicone rubber base, optional siliceous extending filler, organic peroxide, ethylpolysilicate, and acryloxyalkylsilane has been developed. The composition yields cohesive bonding to many kinds of substrates using many kinds of silicone rubber bases and vinyl specific or non-vinyl specific organic peroxide catalysts. The physical properties of the cured silicone rubber are not deleteriously altered by the addition of the adhesion additive combination.

An improved method of obtaining bonding between heat activated, organic peroxide vulcanized silicone rubber and a wide variety of substrates has been developed. An additive containing polydiorganosiloxane gum, ethylpolysilicate, acryloxyalkylsilane, and filler, when mixed with a heat activated, organic peroxide vulcanizable silicone rubber, causes the rubber to bond to substrates when the rubber is vulcanized in contact with the substrate. It is not necessary to first prime the surface of the substrate in order to obtain the improved bond.

Silicone rubber bonded through the use of the method of this invention adheres to a wider number of substrates than previously known methods, the adhesion being sufficient to cause cohesive failure when the bond is sufficiently stressed to cause failure.

Silicone rubber compositions of this invention can be formed and cured by molding, calendering, and extruding and cured under pressure or not under pressure and produce cohesive bonds to substrates that are heat stable and water immersion stable.

The method of this invention provides a means whereby a rubber fabricator can easily modify his known formulations so that they will bond cohesively to many substrates, maintain a satisfactory range of physical properties, cure with either vinyl specific or non-vinyl specific organic peroxides, and mold, calender, or extrude as desired. The rubber fabricator needs only add to his formulation an appropriate amount of the adhesion additive of this invention.

DESCRIPTION OF THE INVENTION

This invention relates to a heat vulcanizable silicone rubber composition comprising 100 parts by weight of silicone rubber base consisting essentially of polydiorganosiloxane containing organic radicals selected from the group consisting of methyl, vinyl, phenyl, and 3,3,3-trifluoropropyl, reinforcing silica filler, and anticrepe-hardening agent; from 0 to 150 parts by weight of siliceous extending filler with an average particle size of less than 25 micrometres and a surface area of less than 50 m$^2$/g; from 0.1 to 5 parts by weight of organic peroxide suitable for vulcanizing the silicone rubber base; from 1 to 5 parts by weight ethylpolysilicate; and from 0.1 to 1 part by weight acryloxyalkylsilane of the formula

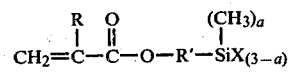

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive, the amount of ethylpolysilicate and acryloxyalkylsilane being present in amounts such that the value obtained by multiplying the numerical values for their respective parts by weight is less than 3.5, and the amount of ethylpolysilicate plus acryloxyalkylsilane being less than 4 percent by weight of the silicone rubber composition.

This invention also relates to an adhesion additive composition for improving the bonding of heat vulcanized silicone rubber to substrates consisting essentially of (a) 100 parts by weight of polydiorganosiloxane gum, wherein the organic radicals are selected from the group consisting of methyl, vinyl, phenyl, 3,3,3-trifluoropropyl radicals, and mixtures thereof, (b) from 70 to 220 parts by weight of ethylpolysilicate, (c) from 10 to 40 parts by weight of acryloxyalkylsilane of the formula

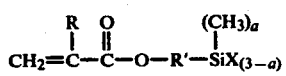

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive, and (d) sufficient filler to yield a paste, the paste being stored in a container which prevents moisture from contacting the paste.

A method of carrying out this invention comprises mixing silicone rubber stock comprising silicone rubber base, filler if desired, and organic peroxide, with an amount of adhesion additive composition sufficient to provide less than 4 percent by weight of the combined weight of ethylpolysilicate and the acryloxyalkylsilane based on the silicone rubber composition. After mixing the ingredients, the resulting mixture is placed in contact with a substrate to which bonding is desired, and then this combination is heated to a vulcanization temperature to produce a silicone rubber bonded to a substrate.

In this invention, a silicone rubber "base" is a mixture of polydiorganosiloxane, reinforcing silica filler, anti-crepe-hardening agent, and possibly other minor ingredients. When this base is mixed with organic peroxide, additional reinforcing and/or extending filler, and other minor ingredients, the mixture is then called a "stock".

A unique combination of ingredients has been discovered which produces outstanding bonds between heat-vulcanizable silicone rubber compositions and a variety of substrates using either vinyl specific or non-vinyl specific organic peroxide. Unmodified silicone rubber does not ordinarily bond to substrate surfaces. When such unmodified silicone rubber is vulcanized in contact with a surface, the rubber can usually be pulled from the surface with the failure being between the surface and the silicone rubber.

Various methods of improving the bond between a substrate and silicone rubber have been advanced, including the use of various primers and the use of additives to the silicone rubber composition. The use of primers entails an additional step in the bonding process which may be undesirable due to the additional time and cost involved. The use of additives in silicone rubber compositions may be undesirable due to the effects of the additive upon the physical and chemical properties of the cured rubber. Additives are known which provide bonding under specific conditions, but do not provide satisfactory bonding to many kinds of substrates with many kinds of silicone rubber and various kinds of organic peroxide catalysts. The unique combination of additives of this invention have been found to solve these problems.

It has been found that when a silicone rubber composition is prepared with from 1 to 5 parts by weight of ethylpolysilicate and from 0.1 to 1 part by weight of acryloxyalkylsilane to 100 parts by weight of silicone rubber base, the composition bonds to a wide variety of substrates that it is in contact with when vulcanized. The combinations of ethylpolysilicate and acryloxyalkylsilane which provide both satisfactory bonding to substrates and silicone rubber with satisfactory physical properties are those which fall in the range such that the numerical value for the amount of ethylpolysilicate times the numerical value for the amount of acryloxyalkylsilane is less than 3.5 and the sum of the amounts of ethylpolysilicate and acryloxyalkylsilane is less than 4 weight percent of the silicone rubber composition. Cohesive type bonding occurs using a vinyl specific catalyst such as 2,5-bis-(tert-butylperoxy)2,5-dimethylhexane which is commonly used for molding silicone rubber parts and also with a non-vinyl specific catalyst such as 2,4-dichlorobenzoyl peroxide which is commonly used for extrusions that are cured by heating in hot air. When less than the specified amounts of ethylpolysilicate and acryloxyalkylsilane are used, the bonding is not of the required cohesive type or the variety of substrates cohesively bonded to is greatly reduced. When more than the specified amounts of ethylpolysilicate and acryloxyalkylsilane are used, the physical properties of the cured silicone rubber are deleteriously altered. As the amount of the ethylpolysilicate and acryloxyalkylsilane is increased, the effect upon the physical properties of the cured silicone rubber comes more apparent. The change in properties upon heat aging is reflected by the change in the elongation at break. Because many specifications for silicone rubber require that the elongation on heat aging does not decrease more than 65 percent, the combinations of ethylpolysilicate and acryloxyalkylsilane is limited such that the value obtained by multiplying the numerical values for their respective parts by weight is less than 3.5. The parts by weight used in this calculation are based on 100 parts by weight of silicone rubber base. For example, if the amount of ethylpolysilicate being used is 4 parts by weight per 100 parts by weight of silicone rubber base, the amount of acryloxyalkylsilane should not exceed 0.875 part by weight based on 100 parts by weight of silicone rubber base. Conversely, if one part of acryloxyalkylsilane per 100 parts by weight of silicone rubber is used, the amount of ethylpolysilicate should not exceed 3.5 parts by weight based on 100 parts by weight of silicone rubber base. In both these examples, the silicone rubber composition which includes extending filler, if used, the combined amounts of ethylpolysilicate and acryloxyalkylsilane should be less than 4 percent by weight. Therefore, to use 4 parts by weight ethylpolysilicate, 0.87 part by weight of an acryloxyalkylsilane, and 100 parts by weight of a silicone rubber base, more than 17 parts by weight of a siliceous extending filler would be used. The use of more than the necessary amount of the additives is also uneconomical as it does not further improve the bonding. When sufficient additives are used to obtain cohesive bonding, there is then no reason to add an additional amount as the bonding cannot be further improved because the rubber itself is failing. Within the defined range, the optimum amount of ethylpolysilicate and acryloxyalkylsilane varies with both the nature of the silicone rubber composition and the nature of the substrate surface to be bonded. As the filler content of the silicone rubber composition is increased, more of the ethylpolysilicate and acryloxyalkylsilane are needed. If more of the adhesion additives are added than are needed to provide cohesive bonding for the silicone rubber stock being used, the stock will become softer and stickier. If carried too far, the stock may not be suitable for processing by calendering or extruding. For this reason, the total amount of ethylpolysilicate plus acryloxyalkylsilane is less than 4 percent by weight of the silicone rubber composition. The preferred amount of the adhesion additives is that amount which gives the required cohesive bonding to the substrate in any particular combination of silicone rubber stock and substrate. At the present time the preferred ratio of acryloxyalkylsilane to ethylpolysilicate is from 1:2 to 1:10 with the most preferred ratio being about 1:5. The preferred amount of ethylpolysilicate is from 1.5 to 3.5 parts by weight with the amount of acryloxyalkysilane from 0.2 to 0.5 part by weight. The most preferred amount of ethylpolysilicate is 2.4 parts by weight with 0.45 part by weight of gamma-methacryloxypropyltrimethoxysilane as the acryloxyalkysilane, all being based on 100 parts by weight of silicone rubber base.

By using the combination of ethylpolysilicate and acryloxyalkylsilane in silicone rubber compositions, bonding to a wide variety of substrates can be achieved without significantly effecting the physical properties of the cured silicone rubber. Mixing ethylpolysilicate and a silicone rubber base can improve the adhesion to some substrates, however, large amounts are required and the physical properties of the silicone rubber are adversely effected. The adhesion, using ethylpolysilicate, can sometimes provide cohesive type adhesion failure with some substrates if the amount of ethylpolysilicate is large enough, but often, ethylpolysilicate alone does not provide the require cohesive bond to substrates. Mixing acryloxyalkylsilane and a vinyl-containing silicone base can improve the adhesion to provide cohesive type failure with a variety of substrates if the peroxide used for vulcanization is a vinyl specific organic peroxide. Acryloxyalkylsilane used in a composition with a non-vinyl specific organic peroxide such as is required for hot air vulcanization does not provide the required cohesive bonding. Using the combination of ethylpolysilicate and acryloxyalkylsilane unexpectedly allows the use of either vinyl specific organic peroxide or non-vinyl specific organic peroxide without causing the physical properties to be deleteriously altered, and provides adhesion of the cohesive type to a variety of substrates. This permits use of non-vinyl specific catalysts such as 2,4-dichlorobenzoyl peroxide in extrusion applications, for instance when cure by heating in hot air is a preferred method. Also, the use of the combination of ethylpolysilicate and acryloxysilane allows use in silicone rubber bases both with and without vinyl radicals present.

The performance of the combination of ethylpolysilicate and acryloxyalkylsilane is unexpected from the results of either one alone. The combination gives cohesive bonds with amounts much lower than those required by either alone. The combination bonds cohesively to a wider variety of substrates than does either alone. Neither ethylpolysilicate or acryloxyalkylsilane maintained a cohesive bond after heat aging or after water immersion when tested on aluminum, cold rolled steel, and stainless steel substrates. When the combination was tested at amounts within the limits of this invention, cohesive bonding was present with all substrates and under all the test conditions. The combination is also unique in its effect upon the physical properties of the cured silicone rubber composition. For instance, the acryloxyalkylsilane alone increases the durometer and lowers the elongation of a stock to which it is added. The ethylpolysilicate causes a drop in durometer and an increase in elongation. By adding the combination of acryloxyalkylsilane and ethylpolysilicate within the limits of this invention, the combination can cause less of a change in physical properties than does either additive alone. The changes can be controlled by adjusting the ratio of acryloxyalkylsilane to ethylpolysilicate.

The silicone rubber composition can be produced by mixing silicone rubber base, filler, organic peroxide, ethylpolysilicate, and acryloxyalkylsilane by means of conventional mixing equipment such as doughmixers and 2 roll rubber mills such as normally used to compound silicone rubber. There is no critical order of mixing; however, the filler is normally mixed with the base, the ethylpolysilicate and acryloxyalkylsilane being added with the filler, then adding the organic peroxide. The silicone rubber compositions of this invention can be stored for more than three months without loss of adhesion properties and physical properties.

The ethylpolysilicate and acryloxyalkysilane may also be combined with polydiorganosiloxane gum and filler to yield an adhesion additive composition in the form of a paste. The adhesion additive composition is storage stable in this paste form, provided the paste is stored in a container which prevents moisture from contacting the paste. When a combination of silicone rubber bonded to a substrate is desired, a silicone rubber stock may be produced by mixing the paste with a silicone rubber base, filler, and organic peroxide. The adhesion additive composition of this invention is uniquely useful because it can be combined with a silicone rubber base of either a vinyl containing type or non-vinyl containing type. The catalyst can be either vinyl specific or non-vinyl specific. The adhesion additive composition is thus particularly useful because it provides cohesive bonding to substrates in a wide variety of situations. A silicone rubber fabricator can now modify any of his normal silicone rubber formulations by adding the adhesion additive composition to produce a composition which will both cohesively adhere to substrates and provide the physical properties for which the formulation was originally developed.

Useful adhesion additive compositions are produced from 100 parts by weight of polydiorganosiloxane gum, from 70 to 220 parts by weight of ethylpolysilicate, and from 10 to 40 parts by weight of acryloxyalkysilane, the mixture being thickened with sufficient filler to yield a paste. A particularly useful filler is reinforcing silica, in that about 10 percent by weight filler is sufficient to produce a paste when 50 percent by weight ethylpolysilicate and 10 percent by weight acryloxyalkylsilane are combined with 30 percent polydiorganosiloxane gum. A preferred adhesion additive composition is produced using from 110 to 160 parts by weight of ethylpolysilicate and from 20 to 35 parts by weight of acryloxyalkylsilane.

Since the ethylpolysilicate and acryloxyalkylsilane can hydrolyze and condense when contacted with moisture, the adhesion additive composition should be stored in air tight containers to prevent excessive contact with moisture in the air.

Silicone rubber base used in the present invention is a mixture of polydiorganosiloxane, reinforcing silica filler, anticrepe-hardening agent, and minor amounts of additives. Such bases are commercially available. The polydiorganosiloxane contains organic radicals selected from the group consisting of methyl, vinyl, phenyl, and 3,3,3-trifluoropropyl, and mixtures thereof, the polydiorganosiloxane preferably having at least 50 percent of the organic radicals being methyl and no more than 2 percent being vinyl. When used in this invention, there is no requirement that vinyl radicals be present. The polydiorganosiloxane is endblocked with hydroxyl radical or the organic radicals defined above, preferably with methyl or vinyl radical. The polydiorganosiloxanes are commonly of a viscosity of from 1000 Pa·s up to and including non-flowing gums. The polydiorganosiloxanes are well known in the art and are commercially available.

The silicone rubber base contains a reinforcing silica filler to improve the physical strength of the silicone rubber. Reinforcing silica fillers have surface areas of from 150 to greater than 400 m²/g. These reinforcing silica fillers are well known in the art and can be obtained commercially. The reinforcing filler can be untreated, treated, or treated in situ during the manufacture of the silicone rubber base. The treated reinforcing silica fillers can be treated by any of the conventional methods described in the prior art, wherein the treating agents include organosilanes, organosiloxanes and silazanes. The amount of reinforcing filler can vary from 10 to as much as 100 parts by weight and the usual amount varying between 15 and 75 parts by weight per 100 parts by weight of the polydiorganosiloxane.

A silicone rubber base can also contain anticrepe-hardening agents. These anticrepe-hardening agents are used to reduce the reaction between the polydiorganosiloxane and the reinforcing silica that causes the base to become harder or pseudo-vulcanized upon shelf aging. Such a reaction can cause the base to become too "nervy" to be of further use.

Suitable anticrepe-hardening agents are well known in the art. They can be additives such as hydroxyl endblocked short chain polydimethylsiloxane fluids. If the reinforcing filler is treated as discussed above, the silicone rubber base may not need an additional anticrepe-hardening agent.

The silicone rubber base can also contain minor amounts of additives to improve, among other things, the heat stability, handling, compression set, and oil resistance. A single silicone rubber base can be used or a mixture of bases can be used to obtain the desired range of physical properties for the cured silicone rubber.

In use, a silicone rubber base can be extended with an extending filler to increase the bulk of the composition. This helps to lower the cost of the finished part as the extending fillers are much lower in cost than the silicone rubber base.

The addition of an extending filler can also lower the bond strength of a composition intended to be bonded to a substrate surface. The method of this invention provides a means whereby compositions containing large amounts of siliceous extending filler can still be successfully bonded to substrate surfaces. As higher amounts of siliceous extending filler are added, it becomes more difficult to achieve a satisfactory bond to a substrate surface. The maximum amount of siliceous extending filler that can be used and still obtain satisfactory bonding to a substrate surface will depend upon the nature of the silicone rubber base used and the extending filler used. The maximum is about 150 parts by weight of extending filler per 100 parts by weight of silicone rubber base.

The known siliceous extending fillers used with silicone rubber bases are finely ground particles of heat stable inorganic materials with an average particle size of under 25 micrometres. The finest extending fillers approach a particle size and configuration such that they have a surface area of as high as 50 m²/g. Examples of siliceous extending fillers include ground quartz, diatomaceous earth, and glass.

The silicone rubber composition of this invention contains an organic peroxide suitable for vulcanizing the polydiorganosiloxane in the silicone rubber base. When the polydiorganosiloxane does not contain any vinyl radicals, it must be vulcanized with organic peroxides that are efficient in crosslinking such polydiorganosiloxanes. Such organic peroxides are labeled "non-vinyl specific" and are represented by such well known organic peroxides as benzoyl peroxide, dicumyl peroxide, and 2,4,-dichlorobenzoyl peroxide. When the polydiorganosiloxane contains vinyl radicals, it can be vulcanized with either "non-vinyl specific" or "vinyl specific" organic peroxides. Representative of the vinyl specific organic peroxides are ditertiary-butyl peroxide and 2,5-bis-(tert-butylperoxy)-2,5-dimethylhexane. All these organic peroxides and their properties are well known in the art. For continuous hot air vulcanization, as is preferred for extruded rubber parts, 2,4-dichlorobenzoyl peroxide is the preferred catalyst because it gives less porosity in the cured silicone rubber than other catalysts. For molded rubber parts, 2,5-bis-(tert-butylperoxy)-2,5-dimethylhexane is recommended for parts having thick sections. The properties of the vulcanized silicone rubber can be altered by the type and amount of organic peroxide used to vulcanize the composition. Typical changes due to such choices are well recognized in the art. The organic peroxide can be present in amounts of from 0.1 to 5 parts by weight per 100 parts by weight of silicone rubber base, preferably from 0.5 to 2.0 parts by weight.

A required component of the silicone rubber composition of this invention is an acryloxyalkylsilane of the formula

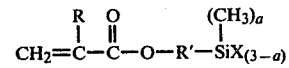

in which R is selected from the group consisting of hydrogen and methyl radical, R' is an alkylene radical of from 1 to 4 inclusive carbon atoms, X is a radical selected from the group consisting of alkoxy radicals of from 1 to 3 inclusive carbon atoms and acetoxy radical, and a is from 0 to 2 inclusive. The silane is preferred where R is a methyl radical, a is 0, and X is a methoxy radical. The most preferred silane is gamma-methacryloxypropyltrimethoxysilane because of its efficiency in causing the vulcanized silicone rubber to bond to a substrate surface against which the silicone rubber has been vulcanized.

The acryloxyalkylsilanes used in this invention are known in the art. Those in which a is zero are disclosed in U.S. Pat. No. 3,567,497 by Plueddemann and Clark which describes those silanes and their method of manufacture. U.S. Pat. No. 3,567,497 is incorporated by reference to show the method of manufacture. The same method can be used to produce silanes in which a is 1 or 2 by substituting the appropriate $(CH_3)HSiX_2$ or $(CH_3)_2HSiX$ for the $HSiX_3$ shown in Pleuddemann et al.

The third general method of preparation described by Plueddemann et al. is applicable where R' is a methylene radical in which the chloroalkylsilane used would be of the formula $ClCH_2(CH_3)_aSiX_{3-a}$. Such chloroalkylsilanes where a is 1 or 2 can be prepared as taught in U.S. Pat. No. 2,510,149 by Speir, which is incorporated by reference to show such preparations. The preferred gamma-methacryloxpropyltrimethoxysilane is commercially available.

Another required component of the composition of this invention is ethylpolysilicate. A suitable commercial product is sold by Stauffer Chemical Company, Specialty Chemical Division, Akron, Ohio under the tradename "Ethylsilicate-40". This product is polymerized so that it is the equivalent of 40 percent by weight $SiO_2$. It has an average formula of

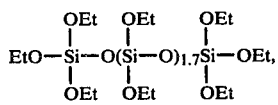

where Et is the —$C_2H_5$ radical.

The compositions of this invention bond to a substrate surface when the composition is cured while in contact with the substrate surface during the vulcanization of the composition. The compositions can be formed in contact with the desired substrate by any of the well known methods of forming elastomeric curable compositions such as press molding, calendering and extruding. Since the compositions bond without primers, special precautions must be taken during vulcanizing operations to ensure that the vulcanized composition adheres only to surfaces where adhesion is desirable. The surfaces of press plates or molds, for instance, must be well coated with a suitable release agent.

Suitable release agents for the method of this invention are heavy coats of a 2 to 5 percent by weight solution of detergent in water, or more preferably, a coating of fluorocarbon mold release agent. For flat surfaces a sheet of polytetrafluoroethylene is satisfactory.

The silicone rubber composition of this invention bonds to different types of substrates. Excellent bonds have been produced with siliceous, metal, and plastic substrate surfaces. Silicone rubber compositions of this invention have been combined with glass fabric, aluminum, cold rolled steel, stainless steel, copper, and brass to give bonds which failed cohesively.

The formed compositions of this invention can be vulcanized by any suitable means that will cause decomposition of the organic peroxide. Heating is the preferred method. The time and temperature necessary to cause vulcanization of the composition is dependent upon the organic peroxide chosen, the method of heating, the method of shaping the composition to the desired configuration, and the thickness of the part. The temperature that is appropriate for a given set of conditions is well known in the silicone rubber art. Typical temperatures are from 110° C. to 175° C. for molding operations and from about 200° C. to as high as 300° C. for the ovens used in continuous hot air vulcanization operations.

For a process of press molding or injection molding, the best choice of organic peroxide is the vinyl specific type, preferably 2,5-bis-(tert-butylperoxy)-2,5-dimethylhexane. The use of the vinyl specific organic peroxide with the ethylpolysilicate and acryloxyalkylsilane provides a means for bonding silicone rubber to substrates without the need for post curing.

For a process of calendering or extruding where the heating for the vulcanization is done in hot gases, such as a hot air oven, the best choice of organic peroxide is the non-vinyl specific type, preferably 2,4-dichlorobenzoyl peroxide. The use of a non-vinyl specific organic peroxide requires additional heating to generate a cohesive bond between the silicone rubber and the substrate. For example, it has been found that heating the vulcanized silicone rubber-substrate combination for 30 minutes at 170° C. provides a satisfactory bond where the substrate is aluminum, cold rolled steel, or stainless steel.

Bonding a silicone rubber to a substrate, following the method of this invention, can be accomplished by many processes. The same silicone rubber base can be used in these processes and the only change required is the selection of the organic peroxide which best suits the vulcanization process for the manufacture of a silicone rubber-substrate laminate. In contrast, if only the acryloxyalkylsilane is used, the organic peroxide is limited to a vinyl specific type, the silicone rubber base requires the presence of vinyl radical, and the vulcanization process is thus limited. A silicone rubber composition prepared using only gamma-methacryloxypropyltrimethoxysilane to promote adhesion and 2,4-dichlorobenzoyl peroxide would not cohesively bond to aluminum or stainless steel even after heating the vulcanized assembly for four hours at 200° C. Silicone rubber compositions of this invention cohesively bond with aluminum and stainless steel with less heating using a non-vinyl specific peroxide.

The method of this invention is useful for making silicone rubber articles that are bonded to a substrate surface. Examples of such articles are metal enclosed shaft seals, shock mounts, rolls, and various types of fabric reinforced articles such as tubing, tapes, and diaphragms. The heat vulcanizable silicone rubber composition of this invention is particularly useful in that it bonds to a greater variety of substrates with a stronger bond than previous compositions.

When bonding to a substrate, the bond should be at least as strong as the rubber itself. If such a bond is produced, there will be rubber left adhering to the substrate surface when sufficient force is applied to remove the cured rubber from the substrate. Such a failure mode is known as cohesive failure. If the bond is weaker than the rubber, the failure is between the substrate surface and the rubber. This type of failure is known as adhesive failure. As is shown in the following examples, the composition of this invention gives bonds of such strength that the failure mode is of the cohesive type. The following examples are included for illustrative purposes only and should not be construed as limiting the invention which is properly delineated by the claims. All parts are parts by weight.

EXAMPLE 1

A. A series of adhesion tests were performed to illustrate the advantages of an adhesion additive in a silicone rubber stock for bonding to a variety of substrates without use of a primer.

Mixtures were compounded consisting of:

a. 100 parts of a commercial silicone rubber base described as a vinyl-containing silicone rubber designed for compounding general purpose stocks. The base was translucent with a specific gravity after curing of 1.12. The base consisted of a vinyl-containing polydimethylsiloxane, a reinforcing fume silica, and a hydroxyl-endblocked polydimethylsiloxane fluid to prevent crepe-hardening of the base, b. 2 parts of iron oxide paste, where indicated in Table I, c. 1 part of organic peroxide vulcanizing agent consisting of 50 weight percent 2,5-bis(tert-butylperoxy)-2,5-dimethylhexane dispersed in an inert carrier powder, and d. the adhesion additives shown in Table I.

After each mixture was compounded with the appropriate adhesion additives as shown in Table I, the mixtures were prepared into test samples by one of two methods. In the first method, the mixture was calendered onto a piece of glass fabric. Metal panels were cleaned by wiping thoroughly with 1,1,1,-trichloroethane, then with acetone. The calendered fabric was press molded against the cleaned surface of the metal panels with the silicone rubber surface of the calendered fabric against the metal surface. Two pieces of the calendered fabric were also molded against each other with the silicone rubber surfaces in contact. All moldings were vulcanized for 10 minutes at 171° C.

In the second method, a piece of glass fabric was placed on the bottom of a chase, a sheet of uncured silicone rubber mixture placed on top and then the samples of materials to be adhered were placed against the silicone rubber mixture. The assembly was then press molded for 10 minutes at 171° C.

After molding, each sample was cut into 25.4 mm wide strips. The strips were then pulled from the various substrate surfaces using a standard tensile testing machine with a rate of 50.8 mm per minute. The strips were pulled from the substrate surface at an angle of 180°. The glass fiber fabric samples were pulled from one another at a total angle of 180° or at 90° each at the point of peeling apart.

The method of failure was noted for each sample. When the rubber is pulled off the surface, the failure point can be between the surface and the rubber at varying levels of force required to obtain separation, or the failure point can be within the rubber, leaving a rubber layer adhered to the substrate. The former type of adhesion failure is referred to as adhesive failure, shown as A in the tables. The latter type of failure is referred to as cohesive failure, shown as C in the tables. If the bond strength between the substrate surface and the rubber is stronger than the strength of the rubber itself, the failure will be cohesive.

The results shown in Table I show that the stock containing the adhesion additives of this invention is superior to a stock containing either of the single adhesion additives as it provides higher peel strengths and the preferred cohesive type of failure.

TABLE I

| | Peel Adhesion, kilonewton per meter | | | | | | | |
|---|---|---|---|---|---|---|---|---|
| | Comparative Examples | | | | | | This Invention | |
| Adhesion Additive | None (1) | 0.25 X (2) | 0.5 X (1) | — (2) 1.0 Y | — (2) 1.5 Y | (2) 3.0 Y | 0.5 pt X (2) 1.5 Y | 0.25 X (2) 3.0 Y |
| Iron Oxide | Yes | No | Yes | No | No | No | No | No |
| Substrate | | | | | | | | |
| Aluminum | 0.12 A | 11.7 C | 3.68 C | — A | 0.79 A | — A | 13.1 C | 1.35 A |
| Cold Rolled Steel | 0.35 A | 10.5 C | 3.32 C | — A | 1.36 A | — C | 11.4 C | 14.9 C |
| Stainless Steel | 0.52 A | 12.2 C | 3.15 C | — A | 2.62 A | — C | 11.4 C | 16.6 C |
| Glass Fabric | 0.88 A | 7.35 C | 3.68* A | — A | 2.28 A | — A+ | 7.35 C | 9.62 C |

Adhesion Additive:
X is gamma-methacryloxypropyltrimethoxysilane
Y is ethylpolysilicate
+Bonded, but still failed adhesively
*Value due to mechanical bonding since failure was observed to be adhesive
(1) Rubber calendered on glass fabric
(2) Rubber molded with glass fabric backing B. A series of mixtures were prepared as in A. consisting of 100 parts of the base of A., 50 parts of ground quartz extending filler, 1 part of the organic peroxide vulcanizing agent of A. and the amounts of adhesion additive shown in Table II.

The mixtures were made into test samples and tested following the second method defined in A.

The results listed in Table II show that the combination of additives gives better results than either additive alone. It is possible to obtain cohesive type failure using only gamma-methacryloxypropyltrimethoxysilane, but by using the combination of this invention it is possible to obtain cohesive type failures combined with higher peel strengths. By using the combination of this invention, less acryloxyalkysilane is required; thus, providing an opportunity of lowering the cost of the ingredients.

TABLE II

| | Peel Adhesion, kilonewton per meter | | | |
|---|---|---|---|---|
| | | Comparative Examples | | This Invention |
| Adhesion Additive | none | 0.5 X — Y | — X 3.0 Y | .25 X 1.5 Y |
| Substrates | | | | |
| Aluminum | 0 A | 7.8 C | 0.35 A | 9.9 C |
| Cold Rolled Steel | 0 A | 7.5 C | 4.7 C | 10.5 C |
| Stainless Steel | 0.52 A | 7.4 C | 0.88 A/C | 11.4 C |
| Glass Fabric | 0.35 A | >0.9 C | 0.79 A | 6.6 C |
| Copper | 0 A | 5.8 C | 0.79 A | 9.6 C |
| Brass | 0 A | 5.8 C | 0.61 A | 7.5 C |

EXAMPLE 2

A commercial silicone rubber base similar to that of Example 1 but having a specific gravity of 1.09 was catalyzed with 1.0 part of the organic peroxide vulcanizing agent of Example 1. Various amounts of ethylpolysilicate (Y) and gamma-methacryloxypropyltrimethoxysilane (X) were added as adhesion additives as shown in Table III.

These mixtures were molded on various substrates and test samples prepared as described in Example 1 by molding the mixtures against the substrates with a glass fabric backing. The degree of adhesion was evaluated by pulling the bonded strip from the substrate and judging the type of failure and effort required to produce failure. The results are shown in Table III. A rating of 1 is no adhesion. Ratings 2 through 4 are progressively stronger bonds with the failure being of the adhesive type. Rating 5 is a cohesive type failure with a rubber layer left adhered to the substrate.

The results show that the combination of ethylpolysilicate and gamma-methacryloxypropyltrimethoxysilane gives improved adhesion over either alone. The combination provides superior adhesion to all of the substrates tested while the individual additives do not provide good adhesion to all of the substrates. The combination of this invention provides a means of bonding to the widest variety of different types of substrates with a single composition.

TABLE III

| | Adhesion Rating | | | | |
|---|---|---|---|---|---|
| | Comparative Examples | | | | This Invention |
| Adhesion Additive | None | 0.1 pt X — Y | — X 1.0 Y | — X 3.0 Y | 0.1 X 1.0 Y |
| Substrate | | | | | |
| Glass Fabric | 2 | 4 | 2 | 2 | 5 |
| Aluminum | 1 | 4 | 1 | 2 | 4 |
| Cold Rolled Steel | 1 | 3 | 1 | 5 | 5 |
| Stainless Steel | 1 | 2 | 1 | 5 | 5 |
| Copper | 1 | 1 | 1 | 4 | 4 |
| Brass | 1 | 1 | 1 | 4 | 4 |

EXAMPLE 3

A commercial silicone rubber base, falling within the scope of the claims and designated as being suitable for hose production because of its high green strength, having a specific gravity of 1.20, was compounded with various amounts of ground quartz filler, ethylpolysilicate (Y), and gamma-methacryloxypropyltrimethoxysilane (X) as shown in Table IV, then catalyzed with 1 part of the organic peroxide vulcanizing agent of Example 1. These mixtures were then molded, test samples prepared, and tested as described in Example 2. The results are shown in Table IV.

The combination of adhesion additives provides a composition which bonds to a greater degree to more different substrates than does a mixture containing either one alone, even if more additive is used. The results also show that the addition of filler tends to lower the degree of adhesion.

TABLE IV

| | Adhesion Rating | | | | | |
|---|---|---|---|---|---|---|
| | Comparative Examples | | | | | This Invention |
| Adhesion | None | 0.1 pt X | 0.1 X | — X | — X | 0.1 X |
| Additive | | — Y | — Y | 1.0 Y | 2.0 Y | 1.0 Y |
| Filler Loading | None | None | 25 pt | 25 pt | 50 pt | 50 pt |
| Substrate | | | | | | |
| Glass Fabric | 1 | 4 | 3 | 4 | 4 | 5 |
| Aluminum | 1 | 5 | 5 | 1 | 1 | 5 |
| Cold Rolled Steel | 1 | 2 | 1 | 5 | 5 | 5 |
| Stainless Steel | 1 | 2 | 1 | 5 | 5 | 5 |
| Copper | 1 | 1 | 1 | 1 | 1 | 4 |

EXAMPLE 4

The base of Example 3 was compounded with 50 parts by weight of ground quartz, 1 part of heat stability additive, 1 part of the organic peroxide vulcanizing agent of Example 1, and the amounts of adhesion additive shown in Table V per 100 parts by weight of base. Then samples were prepared by molding these mixtures into slabs approximately 2.75 mm thick for 10 minutes at 171° C. The cured slabs were cut into test samples and evaluated for physical properties in accordance with ASTM-D412 for tensile strength and elongation and ASTM-D2240 for durometer, Shore A scale. The test results are shown in Table V.

The test results shown that the adhesion additives do not effect the physical properties of the stock to a significant degree in the amounts tested.

TABLE V

| | Comparative Examples | | | This Invention | | |
|---|---|---|---|---|---|---|
| Adhesion Additive | None | 0.25 X — Y | — X 1.0 Y | 0.25 X 1.0 Y | 0.5 X 1.0 Y | 0.25 X 2.0 Y |
| Durometer, Shore A | 75 | 79 | 75 | 76 | 80 | 75 |
| Tensile Strength, MPa | 6.75 | 8.16 | 7.92 | 8.06 | 7.01 | 7.48 |
| Elongation, % | 230 | 190 | 230 | 180 | 170 | 190 |

EXAMPLE 5

An adhesion additive composition was prepared by stirring together in a container 145 parts of ethylpolysilicate, 27 parts of gamma-methacryloxypropyltrimethoxysilane, and 30 parts of fume silica having a surface area of approximately 250 m²/g to give a mixture, then 100 parts of polydimethylsiloxane gum having dimethylvinylsiloxy endblocking and diorganosiloxy units composed of about 0.14 mole percent methylvinylsiloxane units and about 99.86 mole percent dimethylsiloxane units was placed on a two roll rubber mill and the above mixture was mixed into the gum to yield a paste-like adhesion additive composition.

A silicone rubber composition was prepared by milling together on a two roll rubber mill 100 parts of the silicone rubber base of Example 1, 1 part of the organic peroxide vulcanizing agent of Example 1, and 5 parts of the above adhesion additive composition. The silicone rubber composition was molded against cleaned panels of aluminum, copper, brass, stainless steel, and cold-rolled steel, using a sheet of polyester film to prevent adhesion to the press plates. The rubber could not be removed from any of the substrates without causing cohesive failure in the rubber. The polyester sheet could not be removed from the rubber as the bond was stronger than the polyester sheet and the sheet broke.

EXAMPLE 6

A silicone rubber composition was prepared by milling together on a two roll rubber mill 100 parts of the silicone rubber base of Example 1, 2.4 parts of ethylpolysilicate, 0.45 part of gamma-methacryloxypropyltrimethoxysilane and organic peroxide catalyst. Sample "A" was catalyzed with 1.2 parts of 2,4-dichlorobenzoyl peroxide paste. Sample "B" was catalyzed with 0.5 part 2,4-dichlorobenzoyl peroxide paste and 0.7 part para-chlorobenzoyl peroxide paste. These compositions have the same ingredients and amounts as in Example 5 except for the peroxide. The compositions were molded for 5 minutes at 116° C. against cleaned panels and tested as in Example 5. The results were as shown in Table VI. Sample "C" is Example 5 shown as an illustration of the use of the preferred 2,5-bis(tert-butylperoxy)-2,5-dimethylhexane.

TABLE VI

| | Type of Adhesion Failure | | |
|---|---|---|---|
| | Sample | | |
| Substrate | A | B | C |
| Glass Fabric | A | A | — |
| Aluminum | A | A | C |
| Cold Rolled Steel | A/C | A | C |
| Stainless Steel | A | | |
| | | A | C |
| Copper | A | C | C |
| Brass | A | A | C |

After 3 months storage, on retesting, the stainless steel panels gave cohesive failure. All others were the same as originally tested. The panels were then cured an additional 30 minutes at 170° C. The results then found were:

| Substrate | | | |
|---|---|---|---|
| Aluminum | C | C | — |
| Cold Rolled Steel | C | C | — |
| Stainless Steel | C | C | — |
| Copper | A | — | — |

It is apparent that the choice of peroxide and the cure conditions effect the degree of adhesion obtained.

EXAMPLE 7

A comparative example was prepared by milling together on a two roll rubber mill 100 parts of the silicone rubber base of Example 1, 1.3 parts of 2,4-dichlorobenzoyl peroxide paste, and the amount of gamma-methacryloxypropyltrimethoxysilane shown in Table VII. The compositions were molded and tested as in the second method of Example 1 but vulcanizing for 5 minutes at 116° C.

Unlike the result in Example 6, the use of only the gamma-methacryloxypropyltrimethoxysilane did not produce satisfactory adhesion even after further heating and with higher amounts of additive.

TABLE VII

| | Comparative Examples | | | | |
|---|---|---|---|---|---|
| Adhesion Additive, parts | None | 0.15 | 0.75 | 1.5 | 3.0 |
| | Rubber Properties | | | | |
| Durometer, Shore A | 40 | 45 | 46 | 38 | 35 |
| Tensile Strength, MPa | 6.75 | 6.89 | 6.89 | 7.03 | 6.89 |
| Elongation, percent | 510 | 440 | 420 | 600 | 780 |
| | Type of Adhesion Failure | | | | |

TABLE VII-continued

| | Comparative Examples | | | | |
|---|---|---|---|---|---|
| Adhesion Additive, parts | None | 0.15 | 0.75 | 1.5 | 3.0 |
| Substrate | | | | | |
| Aluminum | A | A | A | A | A |
| Stainless Steel | A | A | A | A | A |
| After heating 4 hours at 200° C. | | | | | |
| Aluminum | A | A | A | A | A |
| Stainless Steel | A | A | A | A | A |

EXAMPLE 8

A series of heat vulcanizable silicone rubber compositions were prepared to illustrate the ability of the compositions of this invention to maintain their physical properties.

Compositions were prepared by mixing on a 2 roll mill, 100 parts of the silicone rubber base of Example 1A, 50 parts of ground quartz extending filler, 1 part of the organic peroxide vulcanizing agent of Example 1A, and the amounts of ethylpolysilicate (additive Y) and gamma-methacryloxypropyltrimethoxysilane (additive X) shown in Table VIII.

Portions of each composition were press molded for 10 minutes at 171° C. into test sheets about 1.9 mm thick for testing physical properties. Portions were also post cured for 24 hours at 225° C. and tested for physical properties. The results obtained are shown in Table VIII. Composition 1 shows the physical properties of the silicone rubber stock without any additive. These properties are representative of those desired by the fabricators choice of such a particular stock formulation. Compositions 2 and 3 show the change in properties because of the addition of the additives of this invention within the required amounts.

The remainder of the compositions are comparative examples to illustrate the result obtained when the compositions of this invention are not used. Compositions 4, 5, and 6 are progressively larger amounts of only the gamma-methacryloxypropyltrimethoxysilane. This additive shows little effect upon the durometer, but shows significant effect in lowering the elongation. Compositions 7, 8, and 9 contain progressively larger amounts of only ethylpolysilicate. This additive shows a lowering of the durometer and a significant increase in the elongation. Each additive alone thus is shown to effect the physical properties of the rubber it is added to.

Compositions 10, 11, 12 and 13 are combinations of the two additives that are outside the scope of the compositions of this invention. The physical properties of composition 10 are not significantly changed because only a little of the additives was used. When larger amounts than covered in this invention are used, as in compositions 11, 12, and 13, the differences are more pronounced, particularly after heat aging. The higher amounts of additive give lower durometer after press curing, but much higher durometers after post curing. The change from press cure to post cure has become much more severe. The change in elongation upon heat aging of composition 11 for instance is a 78 percent loss, while that of composition 2, within the scope of the claims, is 65 percent.

The above comparison shows that the use of the compositions within the scope of this invention causes less change in physical properties than when the same additives are used in amounts outside the scope of this invention.

ple 1. Adhesion determinations were made after molding, after heat aging for 7 days at 200° C., and after

TABLE VIII

| Composition | Adhesion Additive Type | Adhesion Additive Amount | Press Molded Durometer Shore A | Press Molded Tensile Strength MPa | Press Molded Elongation percent | Cured 24 hours at 225° C. Durometer Shore A | Cured 24 hours at 225° C. Tensile Strength MPa | Cured 24 hours at 225° C. Elongation percent |
|---|---|---|---|---|---|---|---|---|
| 1 | none | | 51 | 5.17 | 570 | 57 | 5.44 | 480 |
| 2 | X | 0.6 | 47 | 6.37 | 550 | 72 | 6.55 | 190 |
|   | Y | 3.0 | | | | | | |
| 3 | X | 0.1 | 51 | 6.55 | 460 | — | — | — |
|   | Y | 1.0 | | | | | | |
| Comparative Examples | | | | | | | | |
| 4 | X | 0.1 | 52 | 6.89 | 350 | — | — | — |
|   | Y | — | | | | | | |
| 5 | X | 0.6 | 53 | 6.96 | 350 | 65 | 6.96 | 240 |
|   | Y | — | | | | | | |
| 6 | X | 1.2 | 52 | 6.89 | 340 | 70 | 7.58 | 210 |
|   | Y | — | | | | | | |
| 7 | X | — | 48 | 5.86 | 630 | — | — | — |
|   | Y | 1.0 | | | | | | |
| 8 | X | — | 47 | 6.06 | 720 | 67 | 6.37 | 250 |
|   | Y | 3.0 | | | | | | |
| 9 | X | — | 44 | 5.93 | 760 | 79 | 4.96 | 100 |
|   | Y | 6.0 | | | | | | |
| 10 | X | 0.1 | 51 | 6.34 | 500 | — | — | — |
|    | Y | 0.5 | | | | | | |
| 11 | X | 1.2 | 45 | 6.20 | 560 | 75 | 6.20 | 120 |
|    | Y | 3.0 | | | | | | |
| 12 | X | 0.6 | 43 | 5.86 | 650 | 80 | 6.55 | 100 |
|    | Y | 6.0 | | | | | | |
| 13 | X | 1.2 | 40 | 6.20 | 680 | 81 | 6.48 | 100 |
|    | Y | 6.0 | | | | | | |

EXAMPLE 9

The series of compositions of Example 8 were bonded to a variety of substrates and the type of bonding obtained was determined. The bonds were subjected to use type conditions and retested to determine their suitability for bonding subjected to typical silicone application such as heat aging and immersion in water.

The adhesion samples were prepared by placing a thin layer of the composition on a chase, placing a piece of reinforcing fabric over the composition, then another layer of the composition, and finally the sample substrate on top. This composite sandwich was molded for 10 minutes at 171° C. The metal substrates had been cleaned with solvent before being placed in the composite. The adhesion was evaluated as described in Example 1. Adhesion determinations were made after molding, after heat aging for 7 days at 200° C., and after immersion in water for 7 days at room temperature. The results are shown in Table IX. The results of the bonding tests shown in Table IX show that cohesive bond to all the substrates tested was achieved only when both the additives were present (compositions 2 and 11). Neither of the additives alone gave the versatility of bonding shown by the combination. Even when higher amounts of the separate additives were used, the bonding was not satisfactory (compositions 6 and 9). Compositions 11, 12, and 13 used the combination of additives and bonded to most of the substrates tested, but these large amounts of additive adversely effected the physical properties of the compositions as shown in Example 8. Use of the combination of additives in small amounts as in composition 10 did not produce the desired adhesion in all cases.

TABLE IX

| Composition | Adhesion Additive Type | Adhesion Additive Amount | As Molded Aluminum | As Molded Cold Rolled Steel | As Molded Stainless Steel | After Heating Aging Aluminum | After Heating Aging Cold Rolled Steel | After Heating Aging Stainless Steel | After Water Immersion Aluminum | After Water Immersion Cold Rolled Steel | After Water Immersion Stainless Steel |
|---|---|---|---|---|---|---|---|---|---|---|---|
| 1 | none | | none | none | none | — | — | — | — | — | — |
| 2 | X | 0.6 | C | C | C | C | C | C | C | C | C |
|   | Y | 3.0 | | | | | | | | | |
| 3 | X | 0.1 | C | C | C | — | — | — | — | — | — |
|   | Y | 1.0 | | | | | | | | | |
| Comparative Examples | | | | | | | | | | | |
| 4 | X | 0.1 | A | none | none | — | — | — | — | — | — |
|   | Y | — | | | | | | | | | |
| 5 | X | 0.6 | C | C | C | C | none | A-C | C | A | none |
|   | Y | — | | | | | | | | | |
| 6 | X | 1.2 | C | C | C | C | A | A-C | C | A | none |
|   | Y | — | | | | | | | | | |
| 7 | X | — | A | A | A-C | — | — | — | — | — | — |
|   | Y | 1.0 | | | | | | | | | |
| 8 | X | — | none | A | A | A | A | A | none | A | none |
|   | Y | 3.0 | | | | | | | | | |
| 9 | X | — | none | A | A | A | A | A | none | A | A |
|   | Y | 6.0 | | | | | | | | | |

TABLE IX-continued

| | Adhesion Additive | | Adhesion | | | | | | | | |
|---|---|---|---|---|---|---|---|---|---|---|---|
| | | | As Molded | | | After Heating Aging | | | After Water Immersion | | |
| Composition | Type | Amount | Aluminum | Cold Rolled Steel | Stainless Steel | Aluminum | Cold Rolled Steel | Stainless Steel | Aluminum | Cold Rolled Steel | Stainless Steel |
| 10 | X | 0.1 | A | C | C | — | — | — | — | — | — |
|    | Y | 0.5 | | | | | | | | | |
| 11 | X | 1.2 | C | C | C | C | C | C | C | C | C |
|    | Y | 3.0 | | | | | | | | | |
| 12 | X | 0.6 | C | C | C | C | A | C | C | C | C |
|    | Y | 6.0 | | | | | | | | | |
| 13 | X | 1.2 | C | C | C | C | A-C | C | C | C | C |
|    | Y | 6.0 | | | | | | | | | |

That which is claimed is:

1. A heat vulcanizable silicone rubber composition comprising 100 parts by weight of silicone rubber base consisting essentially of polydiorganosiloxane containing organic radicals selected from the group consisting of methyl, vinyl, phenyl, and 3,3,3-trifluoropropyl, reinforcing silica filler, and anticrepe-hardening agent; from 0 to 150 parts by weight of siliceous extending filler with an average particle size of less than 25 micrometres and a surface area of less than 50 m²/g; from 0.1 to 5 parts by weight of organic peroxide suitable for vulcanizing the silicone rubber base; from 1 to 5 parts by weight ethylpolysilicate; and from 0.1 to 1 part by weight acryloxyalkylsilane of the formula

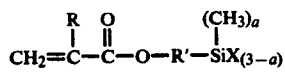

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, a is from 0 to 2 inclusive, the amount of ethylpolysilicate and acryloxyalkylsilane being present in amounts such that the value obtained by multiplying the numerical values for their respective parts by weight is less than 3.5, and the amount of ethylpolysilicate plus acryloxyalkylsilane being less than 4 percent by weight of the silicone rubber composition.

2. The composition of claim 1 in which the acryloxyalkylsilane is gamma-methacryloxypropyltrimethoxysilane.

3. An adhesion additive composition for improving the bonding of heat vulcanized silicone rubber to substrates consisting essentially of:
 (a) 100 parts by weight of polydiorganosiloxane gum, wherein the organic radicals are selected from the group consisting of methyl, vinyl, phenyl, 3,3,3-trifluoropropyl radicals, and mixtures thereof,
 (b) from 70 to 220 parts by weight of ethylpolysilicate,
 (c) from 10 to 40 parts by weight of acryloxyalkylsilane of the formula

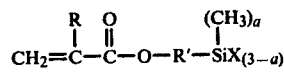

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, and a is from 0 to 2 inclusive, and
 (d) sufficient filler to yield a paste, the paste being stored in a container which prevents moisture from contacting the paste.

4. The composition of claim 3 in which the acryloxyalkylsilane is gamma-methacryloxypropyltrimethoxysilane.

5. The composition of claim 4 in which (b) is from 110 to 160 parts by weight and (c) is from 20 to 35 parts by weight, and (d) is a reinforcing silica.

6. A method of bonding silicone rubber to a substrate comprising
 (1) mixing silicone rubber stock of the type comprising 100 parts by weight of silicone rubber base, from 0 to 150 parts by weight of siliceous extending filler with an average particle size of less than 25 micrometres and a surface area of less than 50 m²/g, and from 0.1 to 5 parts by weight of organic peroxide suitable for vulcanizing the silicone rubber base, with sufficient adhesion additive composition consisting essentially of
  (a) 100 parts by weight of polydiorganosiloxane gum, wherein the organic radicals are selected from the group consisting of methyl, vinyl, phenyl, 3,3,3-trifluoropropyl radicals and mixtures thereof,
  (b) from 70 to 220 parts by weight of ethylpolysilicate,
  (c) from 10 to 40 parts by weight of acryloxyalkylsilane of the formula

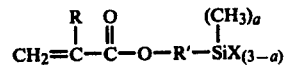

in which R is selected from the group consisting of hydrogen and methyl radical, R' is an alkylene radical of from 1 to 4 inclusive carbon atoms, X is a radical selected from the group consisting of lower alkoxy radicals of from 1 to 3 inclusive carbon atoms and acetoxy radical, a is from 0 to 2 inclusive, to provide an amount such that (b)+(c) is less than 4 percent by weight of silicone rubber composition, to yield a heat vulcanizable silicone rubber composition,
 (2) forming a combination wherein the silicone rubber composition of (1) contacts a surface of the substrate, and thereafter
 (3) heating the combination to a temperature high enough to vulcanize the silicone rubber composition, producing a vulcanized silicone rubber bonded to the substrate surface.

7. The method of claim 6 in which the acryloxyalkylsilane is gamma-methacryloxypropyltrimethoxysilane.

8. The method of claim 7 in which the organic peroxide is a vinyl specific peroxide and the forming and heating are by means of a hot mold.

9. The method of claim 7 in which the organic peroxide is a non-vinyl specific peroxide and the forming is by means of extrusion and the heating is by means of hot gases.

* * * * *